(12) United States Patent
Akuta

(10) Patent No.: US 9,105,990 B2
(45) Date of Patent: Aug. 11, 2015

(54) TERMINAL BLOCK WITH INTEGRAL HEAT SINK AND MOTOR PROVIDED THEREWITH

(75) Inventor: Daisuke Akuta, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 659 days.

(21) Appl. No.: 13/404,331

(22) Filed: Feb. 24, 2012

(65) Prior Publication Data

US 2012/0223601 A1   Sep. 6, 2012

(30) Foreign Application Priority Data

Mar. 3, 2011  (JP) ................... 2011-046481

(51) Int. Cl.
| | |
|---|---|
| H02K 11/00 | (2006.01) |
| H02K 9/00 | (2006.01) |
| F28D 15/00 | (2006.01) |
| H01R 9/24 | (2006.01) |
| H01R 9/22 | (2006.01) |
| H02K 5/22 | (2006.01) |
| H02K 9/19 | (2006.01) |
| H01R 4/30 | (2006.01) |

(52) U.S. Cl.
CPC .................. *H01R 9/22* (2013.01); *H02K 5/225* (2013.01); *H02K 9/19* (2013.01); *H01R 4/302* (2013.01); *H01R 2201/10* (2013.01)

(58) Field of Classification Search
CPC ................................. H02K 9/00; H02K 11/00
USPC ............... 310/52–54, 58, 71, 89; 165/104.33; 439/720, 722
See application file for complete search history.

(56) References Cited

U.S. PATENT DOCUMENTS

2007/0218721 A1   9/2007  Naritomi
2010/0139896 A1*  6/2010  Chamberlin et al. ..... 165/104.33

FOREIGN PATENT DOCUMENTS

| JP | 2008-98007 | 4/2008 |
|---|---|---|
| JP | 2008098007 A * | 4/2008 |

* cited by examiner

*Primary Examiner* — Jose Gonzalez Quinones
(74) *Attorney, Agent, or Firm* — Gerald E. Hespos; Michael J. Porco; Matthew T. Hespos

(57) ABSTRACT

A terminal block (10) to be fixed to a motor case (C) which houses a motor body and includes a coolant flow path (C1) and adapted to fasten busbars by tightening bolts includes nuts (30) for tightening the bolts, and a heat sink (40) made of aluminum die-cast and held in close contact with the nuts (30) via an insulation plate (20) behind the nuts (30). The heat sink (40) includes a heat radiating portion (46) which comes into contact with cooling water passing in the coolant flow path (C1) of the motor case (C).

17 Claims, 7 Drawing Sheets

TERMINAL BLOCK WITH INTEGRAL HEAT SINK AND MOTOR PROVIDED THEREWITH

BACKGROUND OF THE INVENTION

1. Field of the Invention

The invention relates to a terminal block and to a motor provided therewith.

2. Description of the Related Art

Japanese Unexamined Patent Publication No. 2008-98007 discloses a terminal block for electrically connecting conductive members, such as busbars, extending from electric devices, such as a motor and an inverter. This terminal block electrically connects the conductive members of respective electric devices by placing the conductive members one over another on metal nuts insert molded into a terminal block body. Bolts then are screwed into the nuts to fasten the conductive members to the metal nuts.

The electric devices generally generate a large amount of heat and the heat is transferred from the electric devices to the conductive members. As a result, the terminal block connected to the conductive members becomes hot. Further, a large current flow also causes the conductive members to generate heat and makes the terminal block even hotter. Accordingly, a flat synthetic resin insulating plate is disposed below the nuts and a metal heat sink is disposed below the insulating plate. Heat from the conductive members is transferred to the heat sink via the nuts and the insulating member and is intended to be radiated to the atmosphere by a heat radiation fin on the heat sink so that the terminal block is air cooled. However, heat radiated by the heat radiation fin of the air cooled terminal block is likely to stay in a space between the heat radiation fin and a motor case to which the terminal block is fixed. Therefore, heat radiation tends to be low.

Consideration has been given to forming the heat sink with a flat bottom surface. The flat bottom surface of the heat sink could be attached to a heat radiation sheet, which in turn could be fixed to a cooled motor case. Heat of the heat sink would be transferred to the cooled motor case via the heat radiation sheet to improve heat radiation. However, the heat radiation sheet is an additional component and the need to attach the heat radiation sheet to the terminal block deteriorates mass productivity. Further, the terminal block cannot be cooled to a temperature lower than the surface temperature of the motor case, and a heat radiation effect is insufficient if the heat generation is large. Thus, further improvement has been desired.

The invention was completed in view of the above situation and an object thereof is to improve heat radiation of a heat sink without increasing the number of parts.

SUMMARY OF THE INVENTION

The invention relates to a terminal block to be mounted to a motor case that houses a motor body and that includes a coolant flow path. The terminal block has at least one nut and at least one bolt can be tightened to the nut for fastening conductive members. The terminal block also has a heat sink disposed to receive heat from the nut. The heat sink has at least one heat radiating portion that contacts a coolant passing in the coolant flow path of the motor case. Thus, the heat radiating portion is cooled directly by heat exchange with the coolant in the coolant flow path. Heat radiation from the heat sink is better than heat radiation via a heat transfer member such as a heat radiation sheet and air-cooled heat radiation. Hence, heat transfer from the conductive members is improved.

The heat radiating portion may extend substantially along the flow of the coolant in the coolant flow path of the motor case. Thus, the heat radiating portion can be cooled efficiently by heat exchange without blocking the flow of the coolant.

The coolant flow path may be provided substantially circularly in an outer periphery of the motor case; and the heat sink may include an arcuate mounting portion to be fixed to a mount portion on the outer periphery of the motor case.

The heat radiating portion may be provided substantially arcuately on a surface of the mounting portion substantially facing or opposed to the mount portion. Accordingly, the heat radiating portion can be cooled without increasing the number of members and complicating the structure of the heat sink.

The nut may be arranged on a synthetic resin insulation plate that is placed on a surface of the heat sink opposite to a side that has the heat radiating portion.

The insulation plate may be made of synthetic resin having a content of glass and talc of more than about 50%.

The nut may be offset from an arrangement position of the heat radiating portion in a direction away from an axis center of the motor body. Furthermore, a part of a placing surface of the heat sink located closer to the axis center of the motor body than the nut may be exposed. Accordingly, heat generated from the motor body is cooled by the placing surface of the heat sink cooled by the heat radiating portion when being transferred to the nut via a space between the motor and the nut. Thus, the amount of heat transferred from the motor body to the nut can be suppressed as compared with the case where the placing surface is covered by the nut without the nut being offset.

The heat radiating portion may have a cooling fin projecting from a back wall of an arcuate recess formed in the heat sink. Furthermore, the projecting end of the cooling fin may be located in the recess or substantially flush therewith. Accordingly, heat radiation performance of the heat radiating portion is improved since the surface area is larger than the case where the heat sink merely includes a recess. Further, the height of the heat sink can be reduced by providing the cooling fin in the recess, while substantially maintaining the surface area as compared with the case where the cooling fin projects from the surface of the heat sink. Consequently, the cooling fin can be provided without enlarging the terminal block. Further, disposition of the cooling fin in the recess prevents breakage of the cooling fin due to contact with other members during transportation.

The heat radiating portion may be in an area corresponding to a coolant supply/discharge hole formed in the coolant flow path of the motor case.

A molded resin portion may include one or more covers that at least partly cover one or more recesses of the mounting portion of the heat sink.

The heat radiating portion may be arranged before a mounting surface of the mounting portion.

The invention also relates to a motor comprising a motor case that houses a motor body and that includes a coolant flow path. The above-described terminal block is fixed to the motor case.

These and other objects, features and advantages of the present invention will become more apparent upon reading of the following detailed description of preferred embodiments and accompanying drawings.

DETAILED DESCRIPTION OF THE PREFERRED EMBODIMENTS

Figure 1:
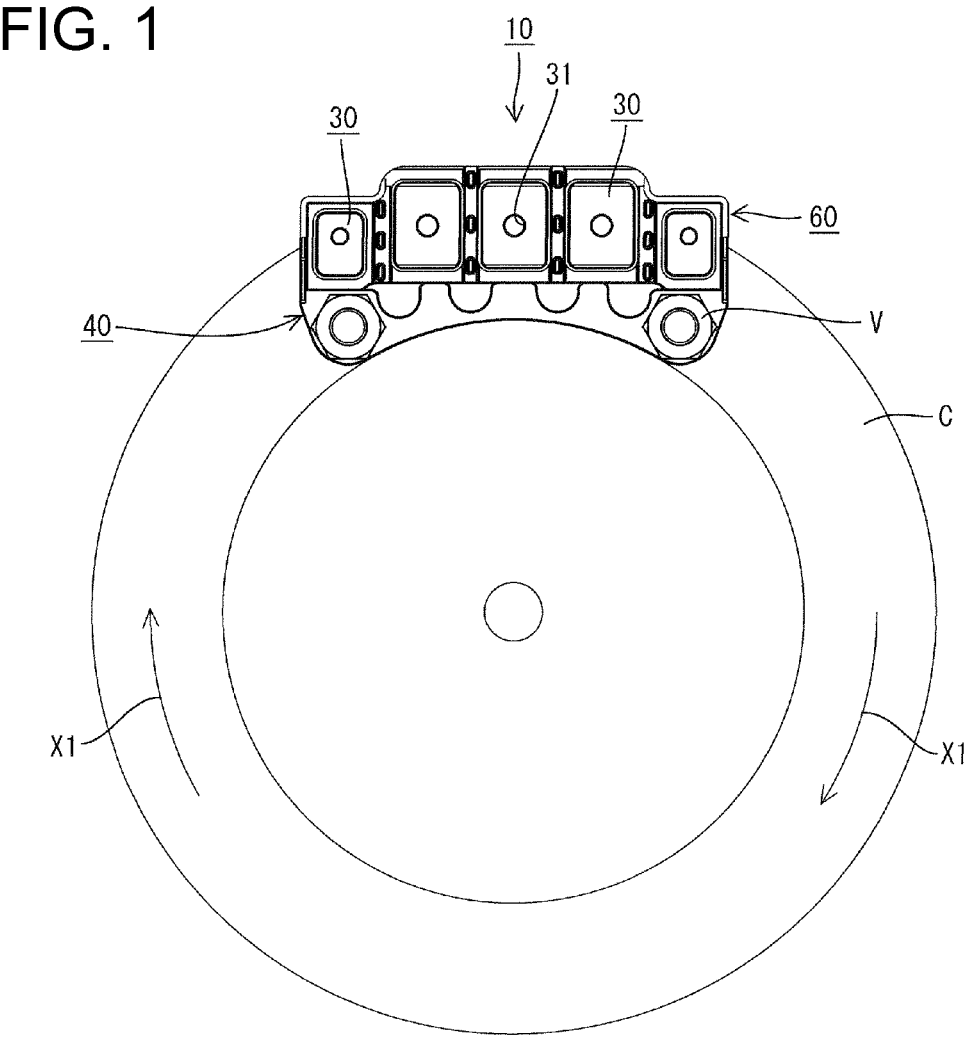
FIG. 1 is a front view showing a terminal block fixed to a motor case.

A terminal block in accordance with the invention is identified by the numeral 10 in the figures and is to be mounted on a substantially cylindrical motor case C that houses a three-phase alternating current motor installed in a vehicle, such as an electric vehicle or a hybrid vehicle, as shown in FIG. 1. A coolant flow path C1 is provided in an outer periphery of the motor case C and accommodates a flow of coolant, such as water or other cooling fluid for cooling the unillustrated motor body. The coolant flow path C1 is provided circularly to cover the outer peripheral surface of the motor body over the entire circumference, and the coolant is circulated in a circumferential direction X1 about a center axis of the motor body.

The terminal block 10 electrically connects a three-pole busbar in the unillustrated three-phase alternating current motor and a three-pole busbar in an unillustrated inverter.

Figure 7:
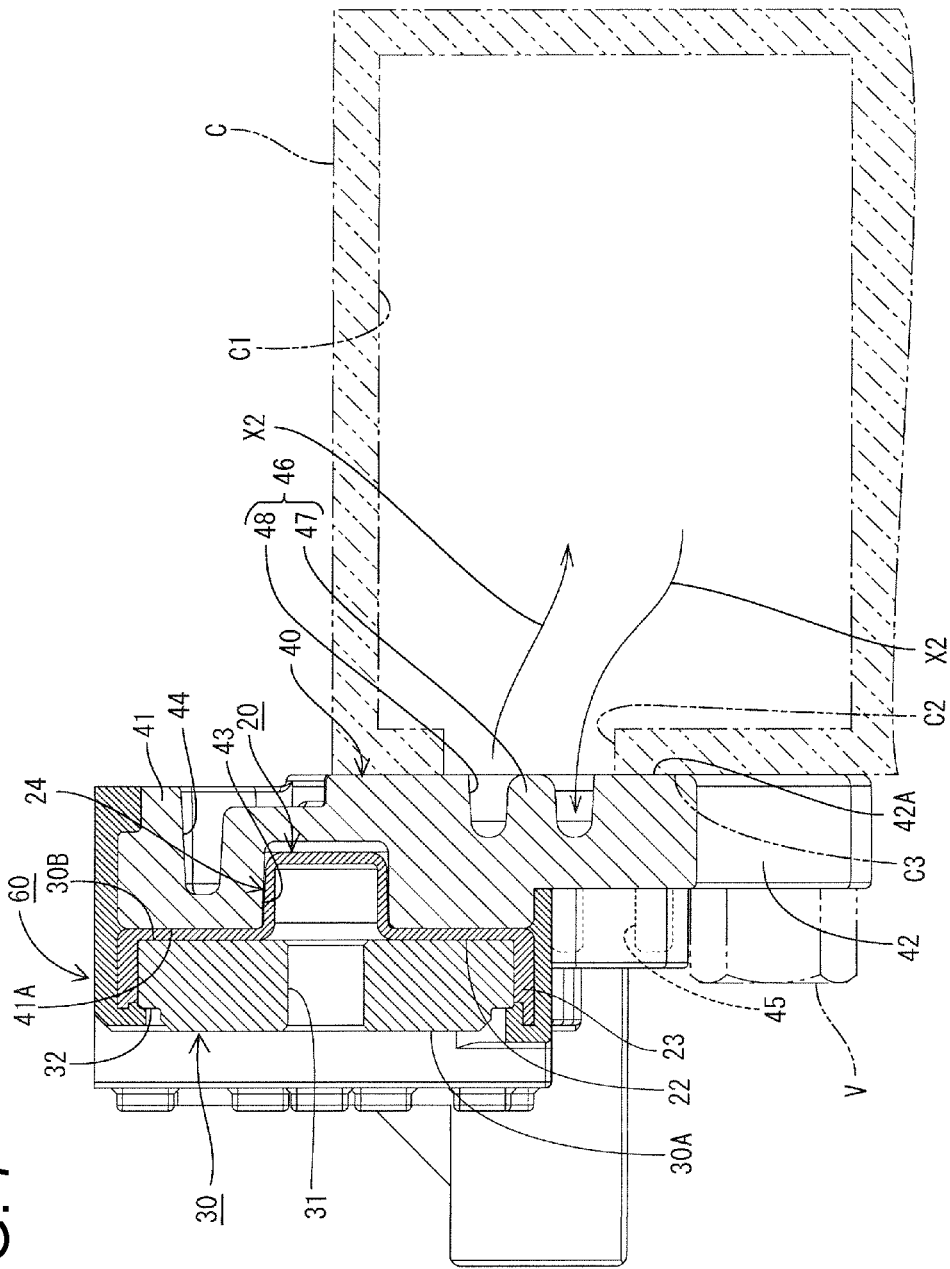
FIG. 7 is a section corresponding to the state where the terminal block is fixed to the motor case.

As shown in FIG. 7, the terminal block 10 includes nuts 30 on which the busbars are to be placed, a heat sink 40 rearward of the nuts 30 and opposite a front side where the busbars are to be placed, a synthetic resin insulation plate 20 sandwiched between the nuts 30 and the heat sink 40 from opposite front and rear ends, and a molded synthetic resin portion 60 at least partly covering the insulation plate 20, the nuts 30 and the heat sink 40. In the following description, a vertical direction is based on FIG. 1, forward and backward directions are based on lateral directions in FIG. 7, and an end to be mounted on the motor case (right side in FIG. 7) is referred to as the rear.

Figure 3:
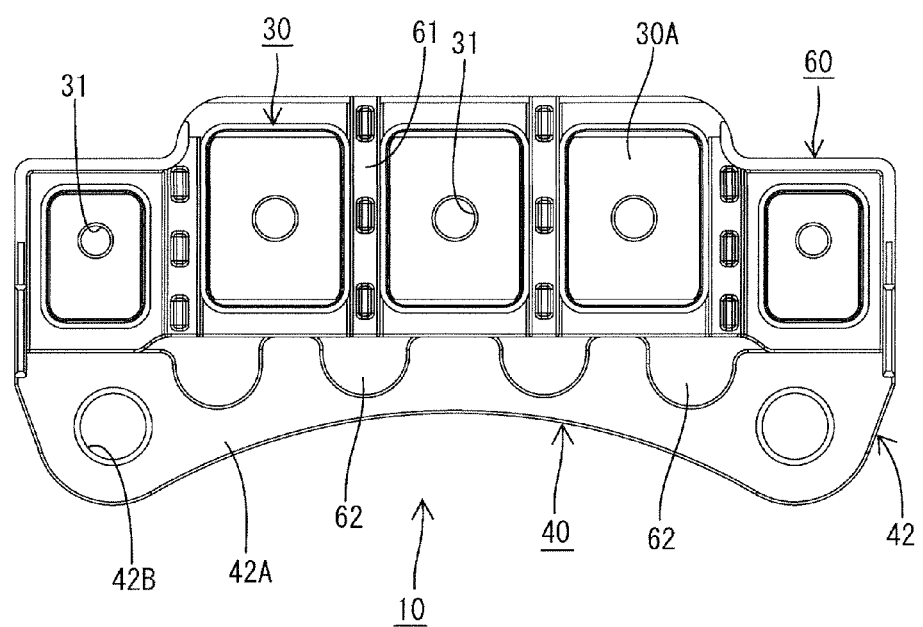
FIG. 3 is a front view of the terminal block.

Each nut 30 is a metal block that is substantially rectangular or polygonal in plan view with rounded corners as shown in FIGS. 3 and 7. The nuts 30 are arranged in the lateral direction. A bolt fastening hole 31 is formed in a central part of each nut 30 and penetrates the respective nut 30 in forward and backward directions. Unillustrated busbars are placed on a front fastening surface 30A of the nut 30 and are fastened by an unillustrated bolt that is threaded into the bolt fastening hole 31.

A step 32 is formed on an outer peripheral part of a front end portion of the nut 30 and is displaced slightly back from the front fastening surface 30A of the nut 30. Further, the front fastening surface 30A, a rear fastening surface 30B and the step 32 of the nut 30 are formed even and flat.

The insulation plate 20 is made of synthetic resin and is formed so that the nuts 30 can be accommodated therein, as shown in FIG. 7, and arranged in the lateral direction, as shown in FIG. 3. The insulation plate 20 includes a bottom wall 22 that closely contacts the rear fastening surfaces 30B of the nuts 30. Surrounding walls 23 extend forward from the bottom wall 22 to surround the side surfaces of the respective nuts 30 over substantially the entire peripheries and bolt escaping recesses 24 project back from the bottom wall 22.

The front and rear surfaces of the bottom wall 22 are flat, so that the front surface of the bottom wall 22 and the rear fastening surfaces 30B of the nuts 30 can closely contact each other.

The insulation plate 20 is made e.g. of synthetic resin having a content of glass and talc of more than about 50% (e.g. about 66%) and has higher thermal conductivity and is less likely to be warped after molding as compared with synthetic resin having a content of glass and talc of about 33%. Thus, the bottom wall 22 of the insulation plate 20 easily is held in close contact with the nuts 30.

The inner peripheral shape of each surrounding wall 23 conforms to the outer shape of the nut 30. Thus, the surrounding wall 23 positions the nut 30 at a proper position, as shown in FIG. 7, when the nut 30 is accommodated into insulation plate 20.

Each bolt escaping recess 24 opens in the front surface of the bottom wall 22 and projects back, as shown in FIG. 7. Further, the bolt escaping recess 24 is arranged substantially coaxially with the bolt fastening hole 31 of the nut 30, so that the leading end of the bolt will not interfere with the bottom wall 22 of the insulation plate 20 as the bolt is threaded into and through the bolt fastening hole 31.

Figure 5:
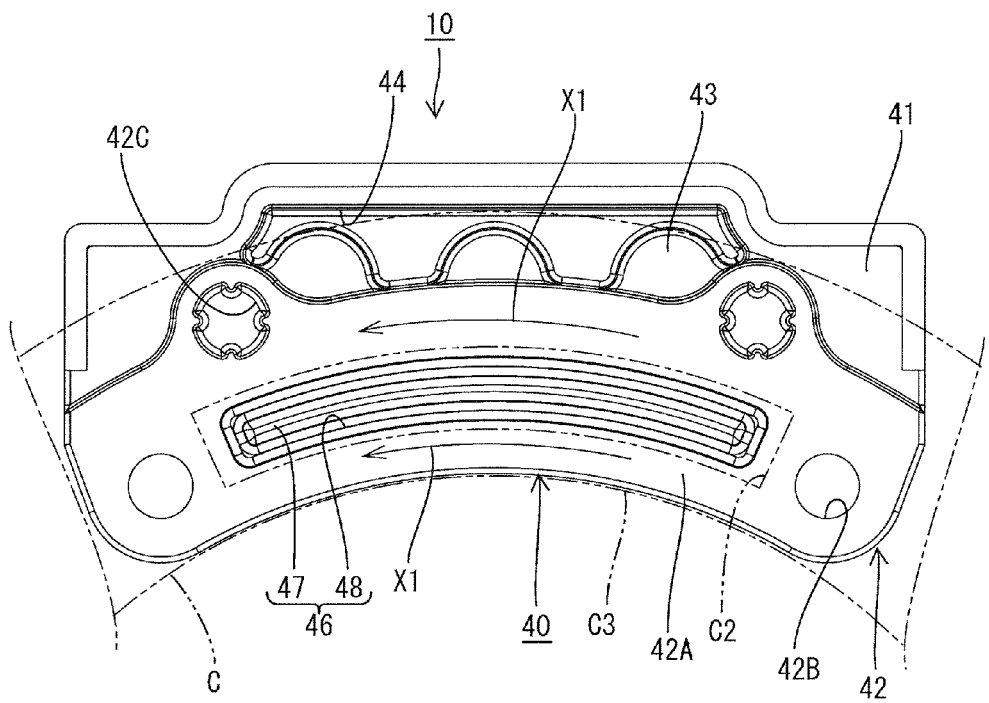
FIG. 5 is a rear view showing the terminal block fixed to the motor case.
Figure 6:
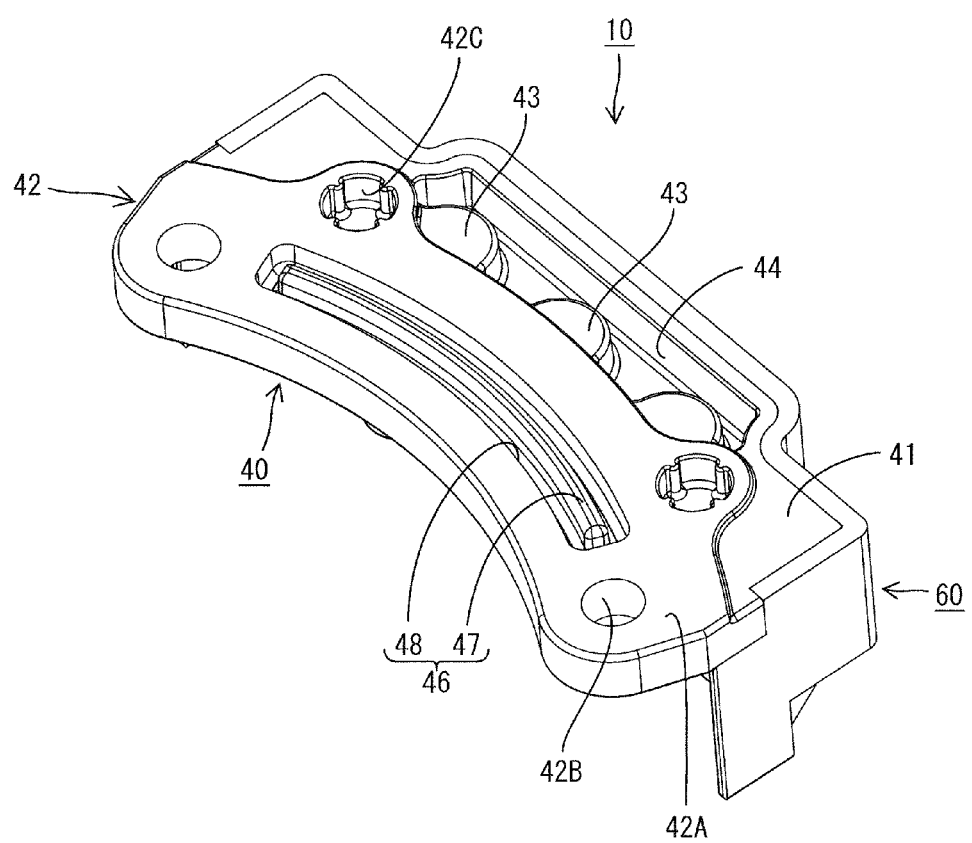
FIG. 6 is a perspective view of the terminal block when viewed from behind.

The heat sink 40 is made of aluminum die-cast or other material with a high thermal capacity and/or thermal heat conductivity and has a wide shape as shown in FIGS. 5 and 6. A sink body 41 is defined at an upper part of the heat sink 40 and receives the insulation plate 20, as shown in FIG. 7. A mounting portion 42 is formed at a lower part of the heat sink 40 and is integral with the lower side of the sink body 41.

The front surface of the sink body 41 is flat and defines a placing surface 41A on which the insulation plate 20 is to be placed. The placing surface 41A is polished to be substantially free from unevenness or roughness. Thus, the rear surface of the bottom wall 22 of the insulation plate 20 and the front surface of the sink body 41 easily are held in close contact with each other, as shown in FIG. 7, so that heat transferred from the busbars to the nuts 30 can be transferred efficiently to the sink body 41 via the bottom wall 22 of the insulation plate 20.

As shown in FIG. 7, forwardly open accommodating recesses 43 are formed in the front surface of the sink body 41 and extend back from the front surface of the sink body 41. Each accommodating recess 43 has a diameter substantially equal to the outer diameter of the bolt escaping recess 24 of the insulation plate 20 so that the bolt escaping recess 24 can nest in the accommodating recess 43. Accordingly, the insulation plate 20 and the heat sink 40 can be positioned with respect to each other and assembled together by fitting the bolt escaping recesses 24 of the insulation plate 20 into the respective accommodating recesses 43. Thus, the nuts 30 are arranged adjacent an intermediate part a central part of the heat sink 40 in the vertical direction and are offset in a direction away from the center axis of the motor body.

As shown in FIGS. 6 and 7, at least one sink-side recess 44 is recessed forward from the back side is provided in a substantially central part of the rear surface of the sink body 41. Substantially cylindrical accommodating recesses 43 project back from the back wall of this sink-side recess 44.

As shown in FIG. 5, the mounting portion 42 is to be fixed to a mount portion C3 on the outer periphery of the motor case C. The mounting portion 42 has a substantially arcuate shape extending in the lateral direction substantially in conformity with the outer peripheral shape of the motor case C. A substantially flat mounting surface 42A is formed rearward of the mounting portion 42 at a position slightly behind the rear surface of the sink body 41, as shown in FIGS. 6 and 7. The mounting surface 42A can be fixed to the motor case C. Positioning holes 42C extend forward from the rear side at two positions on opposite lateral sides of an upper part of the mounting surface 42A. Unillustrated positioning pins project forward from the mount portion C3 of the motor case C and can fit into the respective positioning holes 42C to position the mounting portion 42 with respect to the mount portion C3 of the motor case.

Bolt insertion holes 42B penetrate opposite lateral sides of the mounting portion 42. The mounting surface 42A of the mounting portion 42 is brought into contact with the mount portion C3 of the motor case C and fixing bolts V are inserted into the bolt insertion holes 42B and tightened to fix the terminal block 10 to the motor case C as shown in FIG. 1. Note that the coolant flow path C1 is at the inner side of the mount portion C3 of the motor case C and cooling water is circulated in the circumferential direction X1.

Forwardly extending circular recesses 45 are provided in the front surface of the mounting portion 42.

As shown in FIG. 7, the molded resin portion 60 is shaped unitarily to cover parts of the laterally arranged nuts 30, the insulation plate 20 and the heat sink 40 that have been assembled to one another. Further, the molded resin portion 60 is formed to cover at least part of the sink body 41 of the heat sink 40. The molded resin portion 60 covers the steps 32 of the nuts 30 and front end portions of the surrounding walls 23 of the insulation plate 20 and at least part of an outer peripheral edge of the rear side of the sink body 41 of the heat sink 40. Thus the nuts 30 and the insulation plate 20 are held in close contact in forward and backward directions and the insulation plate 20 and the heat sink 40 are held in close contact in forward and backward directions.

Figure 2:
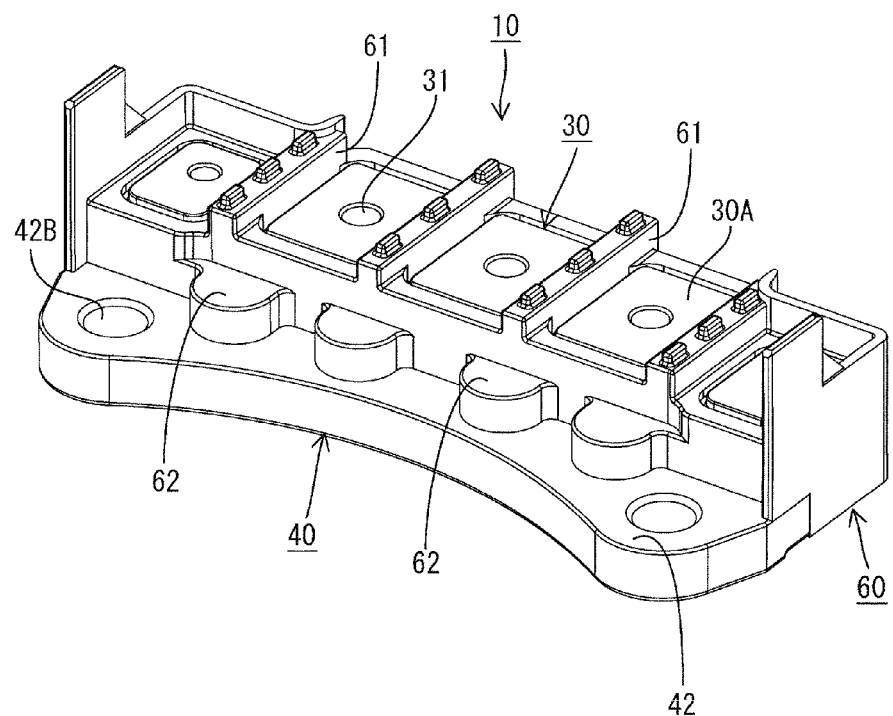
FIG. 2 is a perspective view of the terminal block when viewed from front.
Figure 4:
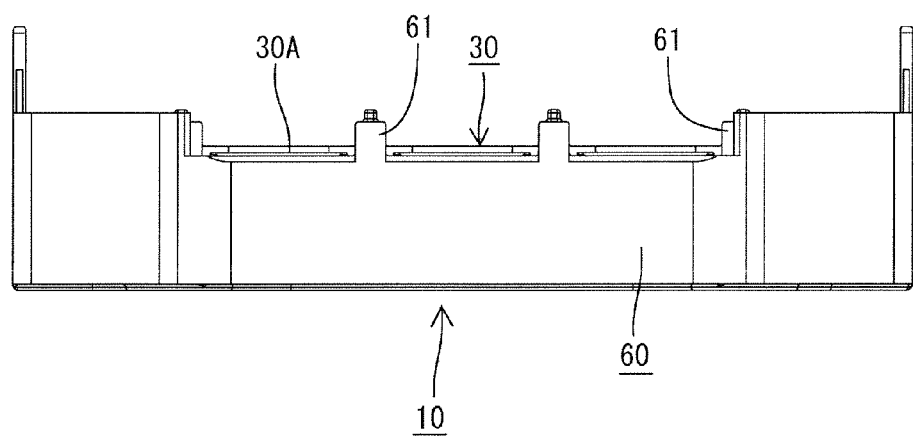
FIG. 4 is a plan view of the terminal block.

As shown in FIGS. 2 and 4, the molded resin portion 60 includes partition walls 61 between adjacent nuts 30. The partition walls 61 project forward from the front surfaces of the busbars placed on the front fastening surfaces 30A of the nut 30 to prevent the busbars from contacting each other and causing a short circuit due to lateral movements of the busbars fastened to the nuts 30.

The molded resin portion 60 also includes covers 62 that at least partly cover the circular recesses 45 of the mounting portion 42 of the heat sink 40 from before. The covers 62 fill the interiors of the circular recesses 45 and substantially cover the upper and side surfaces of the circular recesses 45 to improve a degree of close contact between the molded resin portion 60 and the heat sink 40. On the other hand, parts of the front surface of the mounting portion 42 other than the circular recesses 45 are exposed from the molded resin portion 60. That is, the mounting portions 42 located closer to the axis center of the motor body than the nuts 30 are exposed.

At least one heat radiating portion 46 is provided on the rear surface of the mounting portion 42. As shown in FIG. 5, this heat radiating portion 46 has an arcuate shape and is slightly smaller than an arcuate coolant supply/discharge hole C2 in the mount portion C3 of the motor case C. As shown in FIG. 5, the coolant supply/discharge hole C2 is formed in the coolant flow path C1 of the motor case C substantially along the flow of the cooling water circulating in the circumferential direction X1 in the coolant flow path C1, and the cooling water circulating in the coolant flow path C1 flows, for example, in a direction X2 substantially between a recess 48 and the coolant flow path C1 via the coolant supply/discharge hole C2, as shown in FIG. 7. The heat radiating portion 46 is in an area corresponding to the coolant supply/discharge hole C2 in the mounting portion 42 when the mounting portion 42 is fixed to the mount portion C3 of the motor case C. In this way, the heat radiating portion 46 is cooled by heat exchange with the cooling water circulating in the coolant flow path C1 of the motor case C, and a heat radiation effect from the heat sink can be improved as compared with heat radiation from the heat sink via a heat transfer member, such as a heat radiation sheet and air-cooled heat radiation.

The heat radiating portion 46 is cooled efficiently without blocking or hindering the flow of the cooling water due to the arcuate shape of the heat radiating portion 46 along the flow of the cooling water circulating in the circumferential direction X1 in the coolant flow path C1. Note that an unillustrated seal is mounted on an outer peripheral edge of the heat radiating portion 46 to provide fluid-tight sealing between the motor case C and the mounting portion 42.

As shown in FIGS. 6 and 7, the heat radiating portion 46 is the arcuate recess 48 including a cooling fin 47 inside. The recess 48 is recessed forward from the rear, and the cooling fin 47 projects back from the back wall of the recess 48. The surface area of the heat radiating portion is increased as compared with merely providing a recess, so that heat radiation performance of the heat radiating portion is improved.

The cooling fin 47 is rounded and has an arcuate shape in conformity with the shape of the recess 48 substantially in a vertical central part of the recess 48. The cooling fin 47 is somewhat shorter in the lateral direction than the recess 48 so that opposite lateral ends of the cooling fin 47 are separated from the inner surface of the recess 48. The projecting end of the cooling fin 47 is substantially flush with the mounting surface 42A of the mounting portion 42 so that the cooling fin 47 is completely in the recess 48. This enables the length of the heat sink 40 in forward and backward directions to be shortened while maintaining the surface area as compared with the case where the cooling fin 47 projects from the rear end surface of the mounting portion 42. Consequently, this contributes to miniaturization of the terminal block 10.

The disposition of the cooling fin 47 in the recess 48 avoids breakage due to contact with other members.

The heat radiating portion 46 is arranged before the mounting surface 42A of the mounting portion 42. Thus, the terminal block 10 can also serve as a terminal block which is fixed to a motor case by attaching a heat radiation sheet to the mounting surface 42A. This can reduce production cost as compared with the case of separately producing a terminal block using a heat radiation sheet and a terminal block using cooling water.

The heat radiating portion 46 is provided on the mounting surface 42A of the mounting portion 42. Thus, the heat sink 40 can be cooled without increasing the number of members and complicating the structure of the heat sink 40.

The mounting portion 42 is cooled by the heat radiating portion 46 and is offset up from the vertical central part of the heat sink 40. Thus, an exposed peripheral part of the mounting portion 42 is cooled. That is, heat generated from the motor body is cooled by the mounting portion 42 when being transferred to the nuts 30 via a space lateral to the motor case C. In this way, the amount of heat transferred from the motor body to the nuts 30 can be suppressed as compared with the case where the front surface of the mounting portion 42 is covered by the nuts 30 without the nuts 30 being offset upward.

The invention is not limited to the above described embodiment. For example, the following embodiments are also included in the scope of the invention.

The heat radiating portion 46 is formed on the rear surface of the mounting portion 42 in the above embodiment. However, the invention is not limited to such a mode and the heat radiating portion 46 may be formed on the rear surface of the sink body 41.

Five nuts 30 are arranged laterally in the above embodiment. However, the invention is not limited to that number.

The coolant flow path C1 is in the outer periphery of the motor case. However, the coolant flow path can have other shapes or positions.

The nut 30 is held so as not to fall off by having the step 32 covered by the molded resin portion 60 in the above embodiment. However, the nut may be held so as not to fall off by being press-fit into the insulation plate 20 or the molded resin portion 60.

The heat sink 40 is made of aluminum or aluminum diecast in the above embodiment. However, the heat sink 40 may be made of other heat transferable metal, such as copper.

The mounting portion 42 is fixed to the outer periphery of the motor case C in the above embodiment. However, the mounting portion 42 may be fixed to a cooling water supply path for supplying the cooling water to the coolant flow path C1 of the motor case.

What is claimed is:

1. A terminal block to be fixed to a motor case that houses a motor body and includes a coolant flow path, the terminal block being adapted to fasten at least one conductive member by tightening at least one bolt, comprising:
   at least one nut having opposite front and rear surfaces and a bolt fastening hole extending between the front and rear surfaces for threadedly engaging the bolt to tighten the conductive member to the front surface of the nut;
   a metal heat sink having a placing surface facing the rear surface of the nut and provided so that heat can be transferred from the nut to the heat sink, the heat sink including at least one heat radiating portion on a surface of the heat sink opposite the placing surface and disposed to contact a coolant passing in the coolant flow path of the motor case; and
   a synthetic resin insulation plate between the rear surface of the nut and the placing surface of the heat sink at a side substantially opposite a side where the heat radiating portion is formed.

2. The terminal block of claim 1, wherein the heat radiating portion is formed to extend substantially along the flow of the coolant in the coolant flow path of the motor case.

3. The terminal block of claim 1, wherein:
   the coolant flow path is provided substantially circularly in an outer peripheral edge of the motor case; and
   the heat sink includes an arcuate mounting portion to be fixed to a mount portion on the outer peripheral edge of the motor case.

4. The terminal block of claim 3, wherein the heat radiating portion is substantially arcuately provided on a surface of the mounting portion substantially facing the mount portion.

5. The terminal block of claim 1, wherein the nut is offset from an arrangement position of the heat radiating portion in a direction away from an axis center of the motor body.

6. The terminal block of claim 1, wherein a part of a placing surface of the heat sink is closer to the axis center of the motor body than the nut is exposed.

7. The terminal block of claim 1,
   wherein the heat radiating portion comprises a cooling fin projecting from a back wall of an arcuate recess formed in the heat sink.

8. The terminal block of claim 7, wherein the projecting end of the cooling fin is located in the recess or substantially flush therewith.

9. The terminal block of claim 1, wherein when the mounting portion is fixed to a mount portion of the motor case, the heat radiating portion is arranged in the mounting portion in an area corresponding to a coolant supply/discharge hole formed in the coolant flow path of the motor case.

10. The terminal block of claim 3, further comprising a molded resin portion engaging a peripheral region of the front surface of the nut and part of the surface of the heat sink opposite the placing surface to hold the placing surface of the heat sink and the rear surface of the nut in close contact with the insulating plate, the molded resin portion including at least one cover that at least partly covers at least one recess of the mounting portion of the heat sink.

11. The terminal block of claim 3, wherein the heat radiating portion is arranged before a mounting surface of the mounting portion.

12. A cooling assembly, comprising:
    a motor case that includes a coolant flow path;
    a terminal block fixed to the motor case, the terminal block having at least one nut with a front surface for receiving at least one conductive member, a rear surface opposite the front surface and a bolt fastening hole extending between the front and rear surfaces for receiving a bolt to fasten the at least one conductive member to the nut;
    a metal heat sink having a placing surface facing the rear surface of the nut so that heat can be transferred from the nut, the heat sink including at least one heat radiating portion on a side opposite the placing surface and in the coolant flow path of the motor case for contacting a coolant in the coolant flow path;
    an insulation plate between the nut and a placing surface of the heat sink at a side substantially opposite to a side where the heat radiating portion is formed, the insulating plate being formed from a synthetic resin having a content of glass and talc of more than about 50%; and
    a molded resin portion engaging a peripheral region of the front surface of the nut and part of the surface of the heat sink opposite the placing surface to hold the placing of the heat sink and the insulting plate close to the rear surface of the nut.

13. The assembly of claim 12 wherein the heat radiating portion is formed to extend substantially along the flow of the coolant in the coolant flow path of the motor case.

14. The assembly of claim 13, wherein:
    the coolant flow path is provided substantially circularly in an outer peripheral edge of the motor case; and
    the heat sink includes an arcuate mounting portion to be fixed to a mount portion on the outer peripheral edge of the motor case.

15. The assembly of claim 14, wherein the heat radiating portion is substantially arcuately provided on a surface of the mounting portion substantially facing the mount portion.

16. The assembly of claim 12, wherein the heat radiating portion comprises a cooling fin projecting from a back wall of an arcuate recess formed in the heat sink so that a projecting end of the cooling fin being in the recess or substantially flush therewith.

17. The assembly of claim 12, wherein when the mounting portion is fixed to a mount portion of the motor case, the heat radiating portion is arranged in the mounting portion in an area corresponding to a coolant supply/discharge hole formed in the coolant flow path of the motor case.

* * * * *